United States Patent [19]

Gregg

[11] Patent Number: 5,329,377
[45] Date of Patent: Jul. 12, 1994

[54] FACSIMILE COMMUNICATING AID

[75] Inventor: Stephen A. Gregg, Portland, Oreg.

[73] Assignee: Ethix Corporation, Beaverton, Oreg.

[21] Appl. No.: 944,886

[22] Filed: Sep. 14, 1992

[51] Int. Cl.$^5$ ............................................. H04N 1/00
[52] U.S. Cl. ..................................... 358/400; 341/22
[58] Field of Search ............... 358/400, 401, 403, 498, 358/496, 473; 341/22, 23, 34

[56] References Cited

U.S. PATENT DOCUMENTS

| | | | |
|---|---|---|---|
| 4,731,667 | 3/1988 | Watanabe et al. | 358/401 |
| 4,870,677 | 9/1989 | Di Santo et al. | 341/23 |
| 4,872,008 | 10/1989 | Ohtsuk et al. | 341/22 |
| 4,872,061 | 10/1989 | Uchiyama | 358/400 |
| 5,012,124 | 4/1991 | Hollaway | 341/22 |

Primary Examiner—Edward L. Coles, Sr.
Assistant Examiner—Fan Lee
Attorney, Agent, or Firm—Klarquist, Sparkman, Campbell, Leigh & Whinston

[57] ABSTRACT

An aid for using a facsimile machine including a housing to receive the machine. The housing has an aperture overlying control buttons on the facsimile machine and a flexible membrane extends across the aperture over the control buttons. Discrete regions of the membrane have simplified indicia of machine operation noted thereon and can be pressed to operate underlying buttons on the machine without actuating adjacent controls. Document infeed and outfeed assist devices are provided on the housing as well as storage bays for supplies.

22 Claims, 4 Drawing Sheets

FACSIMILE COMMUNICATING AID

FIELD OF INVENTION

The present invention relates to a device to assist users in directing communications via a facsimile machine, and more particularly to such a device in which a facsimile machine may be housed and which has simplified operating indicia to denote locations to which documents are to be transmitted.

BACKGROUND AND SUMMARY OF THE INVENTION

Although facsimile machines have been available for some time, their operation is somewhat complex for those who do not use them on a frequent basis. Although it is a very useful business communicating tool, unless means are provided to simplify its operation, there are many who will not make use of its benefits due to the difficulty in having to obtain training or reading manuals merely to get started in its use.

An example of a business in which this may occur is in the area of medical claims analysis and review. In this business a party at one location may need to transmit requests for information to another location or department, often without a good working knowledge regarding the specific party or department to which the request should be sent. The party merely knows a general subject matter for the issue at hand. Also the party who needs to transmit a request for information may be unskilled in the use of facsimile machines. What is needed is a simplified means for assisting users, and particularly unskilled users, to operate a facsimile machine allowing them to transmit documents on the basis of subject matter, information needed, area of interest, or other selected indicia of location.

Facsimile machines often have a series of control buttons, some of which may be programmed to speed dial to a preselected receiving location. Further, such machines generally have a document infeed and a document outfeed.

A general object of the present invention is to provide a novel device for assisting users in transmitting documents to selected locations.

More particularly, an object is to provide such a device which includes a housing for receiving a facsimile machine and keying elements overlying control elements on the facsimile machine, which keying elements have simplified indicia of operation thereon permitting a user easily to determine and actuate control elements on the facsimile machine to activate the machine to transmit a document to a preselected location evidenced by the simplified indicia on the keying elements.

A more specific object of the present invention is to provide such a device in which a flexible membrane is mounted on the housing overlying the control elements of the facsimile machine received in the housing, the membrane has simplified transmission indicia regions thereon, and the regions may be discretely pressed downwardly by a user against underlying control elements to transmit documents to select locations.

Yet another object of the invention is to provide such a device wherein the housing substantially covers the facsimile machine to provide protection from wear and tear and particularly that which may occur by untrained users attempting to access the machine for use.

Another object of the present invention is to provide such a device wherein the housing has means for assisting and guiding of documents into the infeed region of the machine to simplify the feed of documents for transmission.

A further object is to provide such a housing which also includes holding bays for supplies to be close at hand for users of the machine.

DRAWINGS

DETAILED DESCRIPTION OF A PREFERRED EMBODIMENT

Figure 1:
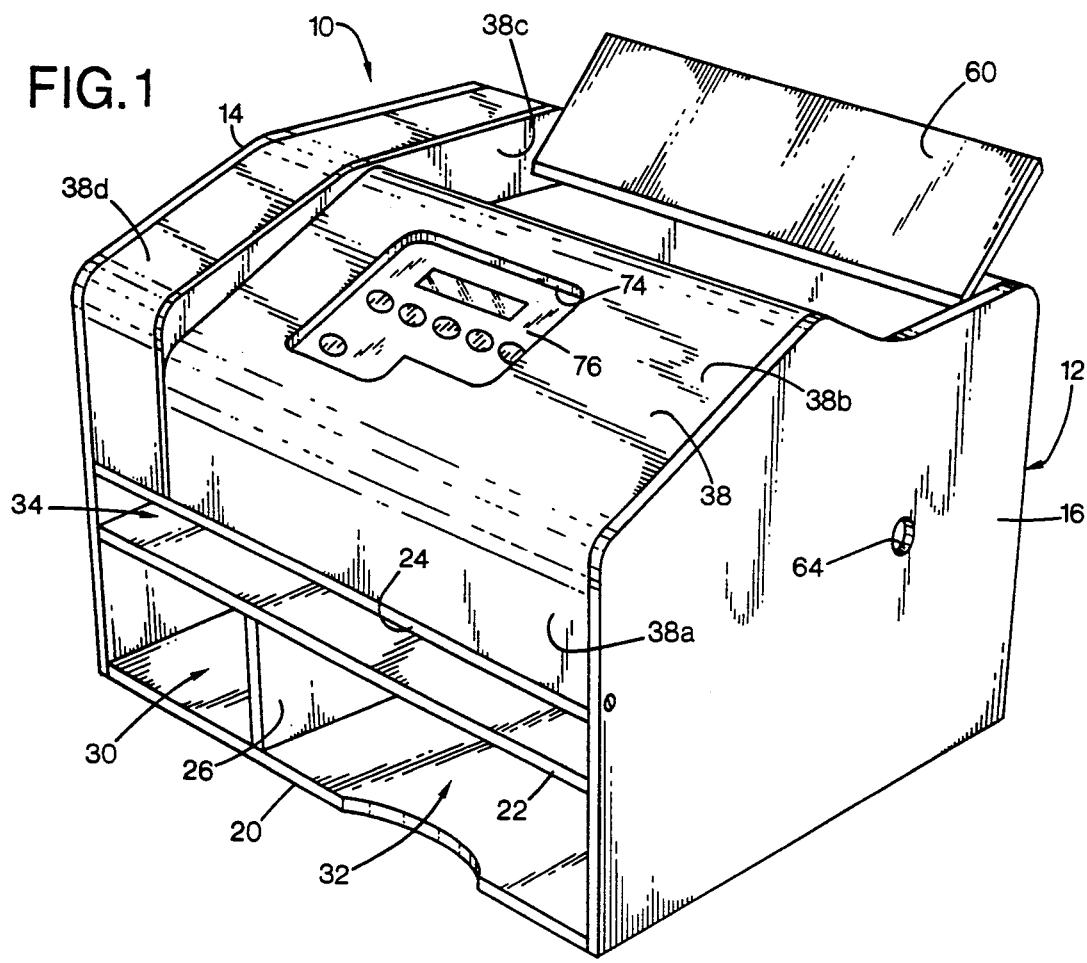
FIG. 1 is perspective view of the front, top, and one side of a device constructed according to an embodiment of the invention.
Figure 2:
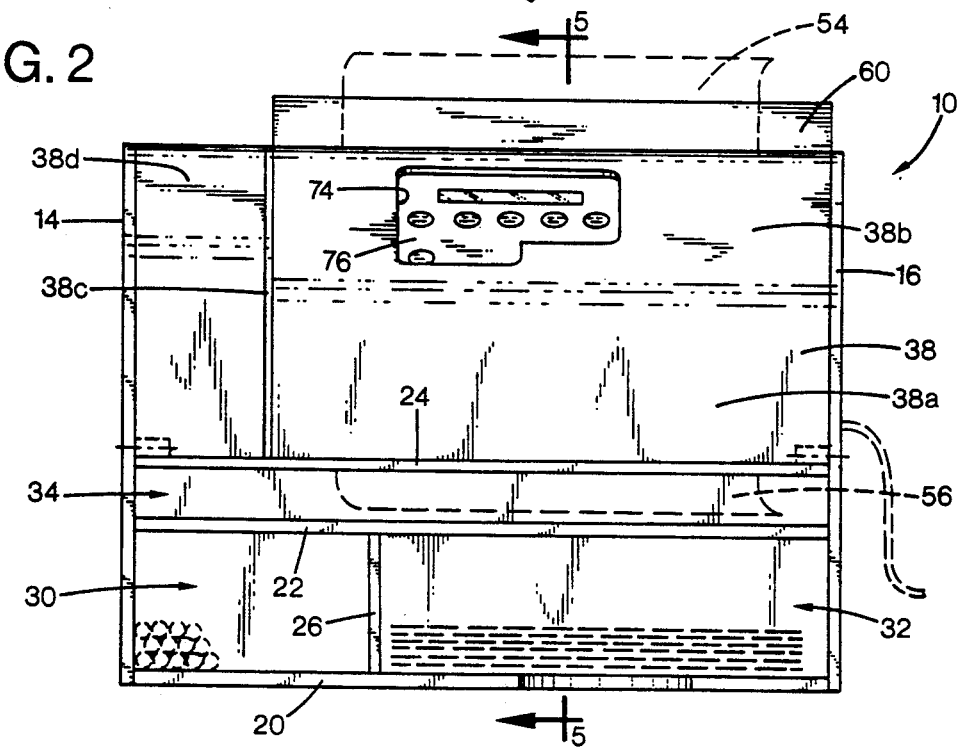
FIG. 2 is a front view of the device illustrated in FIG. 1.

Referring to the drawings and more particularly to FIG. 1, at 10 is indicated generally a device according to a preferred embodiment of the invention. The device includes a housing 12 constructed of substantially rigid material to receive and hold a facsimile machine as will be described in greater detail below.

The housing 12 includes opposed, upright side walls 14, 16. An upright rear wall 18 spans the distance between side walls 12, 16. Three horizontal plates 20, 22, and 24 span the regions between side walls 14, 16 and between rear wall 18 and the front of the housing. An upright divider 26 extends between the plates 20, 22 as illustrated. This produces bays, or bins, 30, 32 adapted to receive and hold materials which may be needed by a user of the device, such as pens and document forms. A space 34 is provided between plates 22, 24, the purpose for which will be described in greater detail below.

Figure 3:
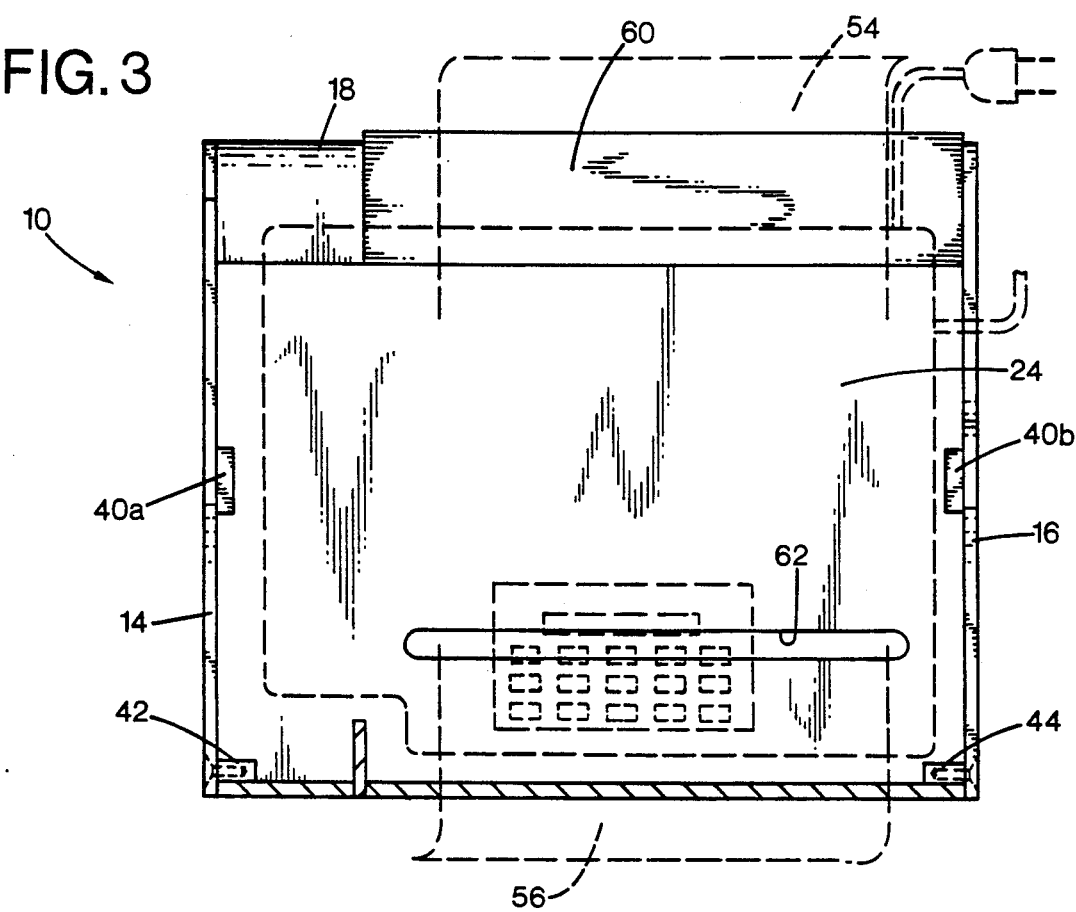
FIG. 3 is a top plan view of the device with a swingable front panel removed to show internal structure of the device.
Figure 4:
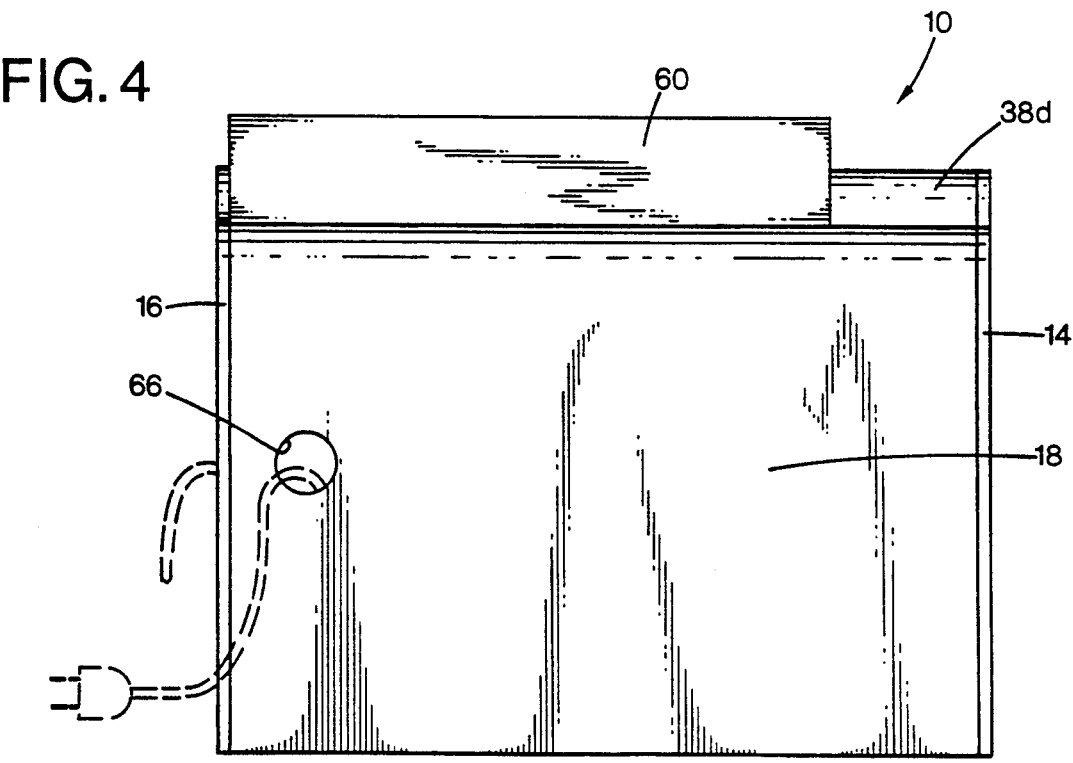
FIG. 4 is a rear elevation view of the device.
Figure 5:
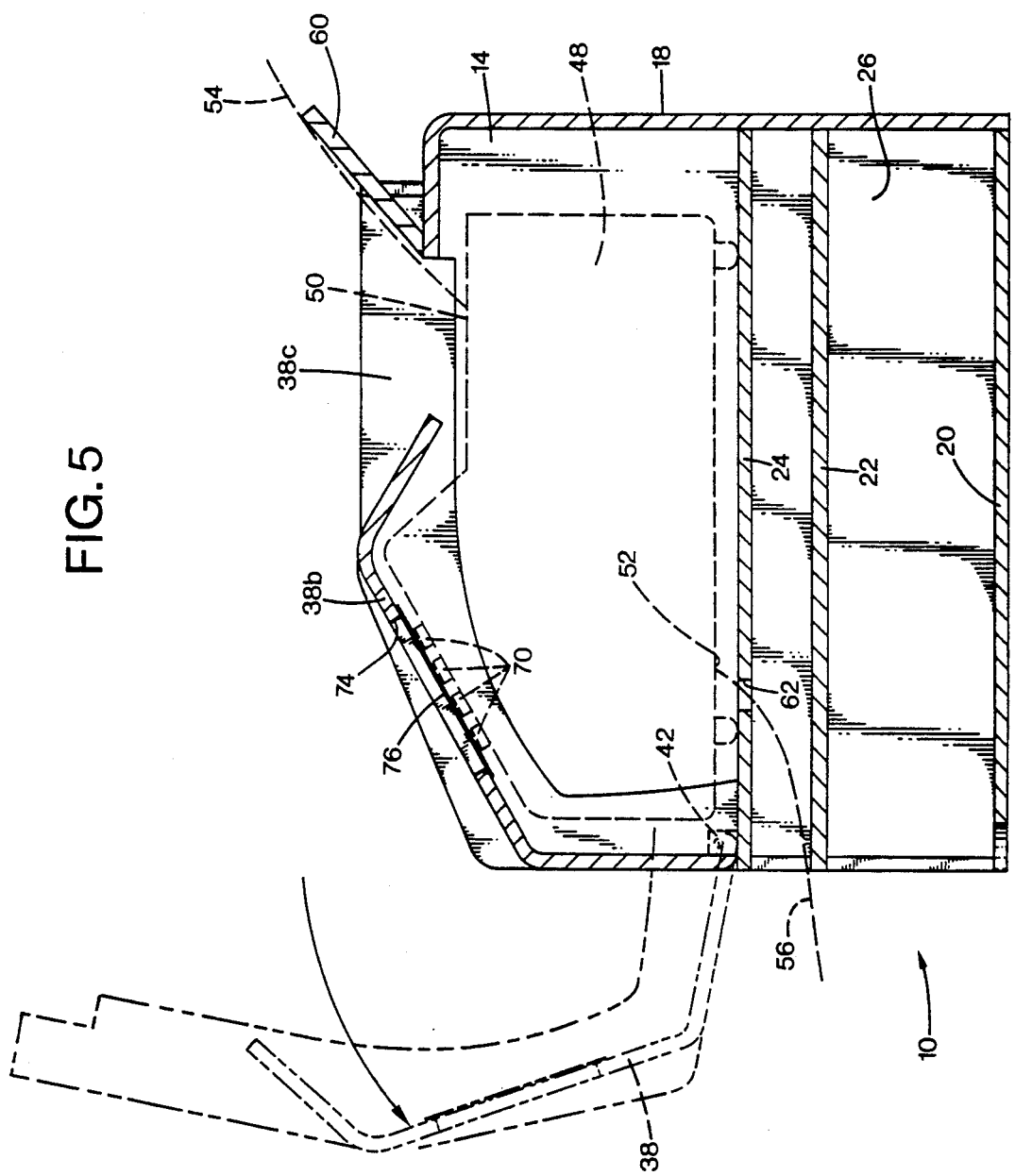
FIG. 5 is an enlarged cross-sectional view taken generally along lines 5—5 of FIG. 2.

The housing 12 further includes a front, or access, panel section 38 having an upright lower portion 38a and an upper portion 38b which inclines upwardly on progressing rearwardly from the front of the device. Secured to one end of portions 38a, 38b, and also forming a part of front panel 38, is a bow-shaped support member 38c which extends rearwardly beyond the rear edge of upper panel section 38d to rest on a portion of back wall 18 as illustrated in FIG. 5. Secured to member 38c is a cover member 38d which also forms a portion of panel section 38. A pair of brace, or support, blocks 40a, 40b (FIG. 3) are secured to side walls 14, 16 in positions to support panel 38 in its proper closed position.

The entire panel section 38 is hingedly connected to the remainder of the housing at hinge points 42, 44 at the lower ends of portions 38, 38d. The front panel section 38 may be swung outwardly from remainder portions of the housing as illustrated in dashed outline in FIG. 5. This allows a facsimile machine, as illustrated in dashed outline at 48, to be inserted into the housing and supported on plate 24, or removed therefrom.

Although the facsimile machine is illustrated only in dashed outline, it should be recognized that such is of usual construction and has an enclosing case, a document infeed region, denoted generally at 50, and a document outfeed region, denoted at 52. A first document being fed into the facsimile machine is illustrated generally at 54 and a document exiting from the machine is indicated generally at 56.

Secured to and provided as a part of housing 10 is a document feed platform, or means, 60 upon which a user may rest a document to properly position and orient the document for feeding into document infeed region 50 of the facsimile machine. Plate 24 on which the facsimile machine rests has an elongated slot 62 formed therein (see FIG. 3) through which a document can exit from the machine and be guided toward a user through space 34. Side wall 16 and rear wall 18 have bores 64, 66, formed therethrough, respectively, to receive electrical and telephone cords for the facsimile machine.

Figure 6:
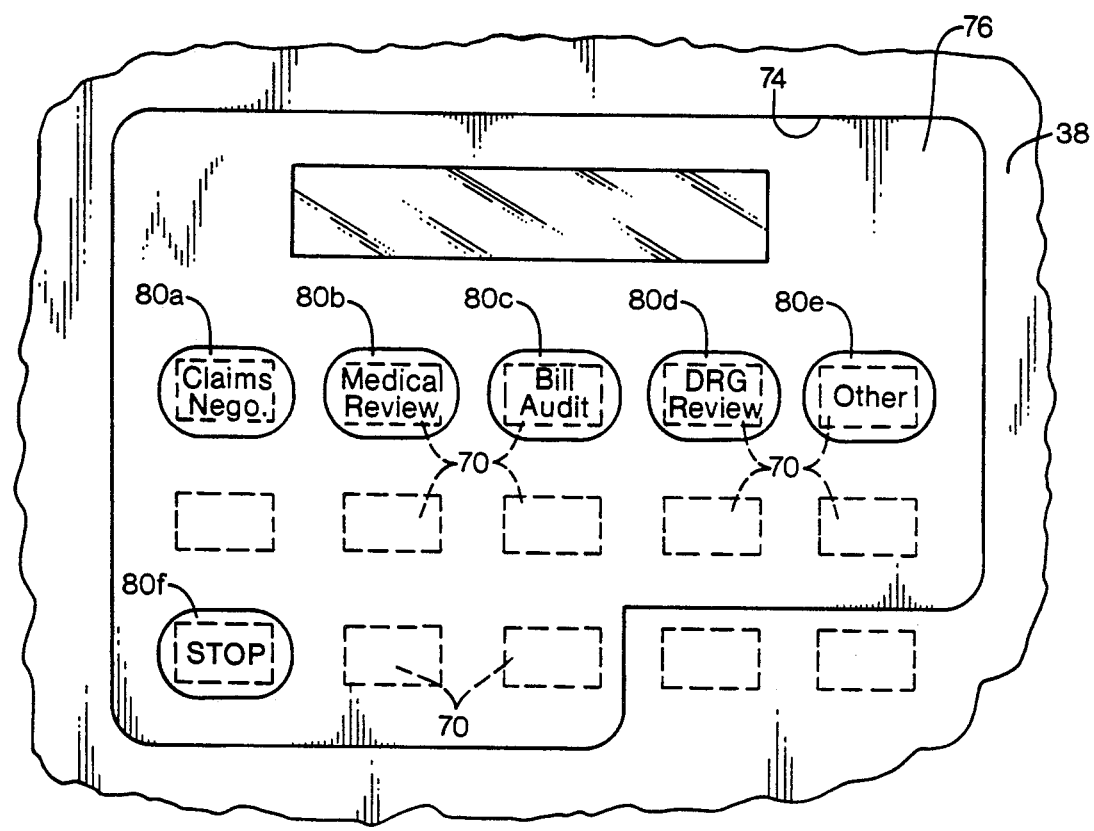
FIG. 6 is an enlarged view of an operating key panel mounted on the device.

Referring again to FIG. 5, the facsimile machine has a series of control elements, or buttons, 70 which are normally accessible and to be manually pressed by a user. The control elements 70 are disposed in discrete rows and columns on the inclined forward face panel of the facsimile machine. In FIG. 6 the control buttons are illustrated in dashed outline. Several of these control elements, or buttons, may be speed dialing controls, each of which when pressed would actuate a speed-dialing routine in the facsimile machine to dial the appropriate number for a preselected location to which a document is to be transmitted.

An enlarged aperture 74 extends fully through panel section 38 in a region overlying control elements 70 on the facsimile machine. A substantially planar, flexible, membrane 76 extends across the aperture and is secured, as by adhesives, adjacent its outer edge margins to the underside of panel 38. The membrane may be constructed of Lexan polycarbonate sheet material made by General Electric having a thickness of 7 mils. The adhesive used to hold the membrane is releasable, allowing the membrane to be removed and replaced as desired.

Referring to FIG. 6, the membrane has a plurality of discrete regions, also referred to as keying elements, defined by somewhat oval boxes 80a, 80b, 80c, 80d, 80e, and 80f. Each of these has a simplified indicia of facsimile machine operating control noted thereon. More specifically, most of the discrete regions illustrated denote a business purpose to be addressed by a party at a location remote from the facsimile machine. They provide the user with a simplified method of transmitting a document to the appropriate location for a desired business purpose.

In the illustrated embodiment each of the oval boxes is about ⅝ inch long and ⅜ inch high. The approximate center-to-center spacing for boxes 80a, 80b, 80c, 80d, 80e is ⅞ inch.

Each discrete indicia 80a, 80b, 80c, 80d, 80e overlies a preselected speed dial control button on the underlying facsimile machine. The notations in the illustrated embodiment deal primarily with medical insurance business matters. If the user wishes to contact a party within the company to address a question regarding claims negotiation, pressing indicia region 80a noted "CLAIMS NEGO" would actuate a preselected speed dialing button causing the facsimile machine to transmit a document to the appropriate department or party handling claims negotiations. Similarly, the user would be able to identify and select the proper party or department to receive questions or material relating to medical review (86b), bill audit (80c), review of DRG bills (80d), or other matters (80e). Since the membrane is removable it may be replaced with another having different indicia therein as desired.

The membrane is flexible and when in its normal, at-rest position, as illustrated in FIG. 5, it is spaced slightly above the tops of control buttons 70. The membrane has sufficient flexibility that a user may press a selected discrete region of the membrane (i.e., CLAIMS NEGO—80a) and press it downwardly from its nonactuating at-rest position as shown, to an actuating position contacting and pressing downwardly on a selected control button to actuate the selected control button on the enclosed machine. Upon release of such pressure by the user, the membrane returns to its nonactuating at-rest position spaced above the control buttons. The membrane is sufficiently flexible in the region of each indicia region that it may be shifted from its nonactuating to its actuating position without shifting an adjacent indicia region to its actuating position.

The device is easily set up for use and provides a simple method for unskilled users to transmit documents to selected locations. Initially, the front panel 38 is swung open to the position illustrated in dashed outline in FIG. 5 and a facsimile machine is inserted therein as indicated in dashed outline at 48 in FIG. 5. The front panel 38 is swung back to its covering, closed, position as illustrated in solid outline in the figures with membrane 76 overlying control buttons 70 on the facsimile machine.

A user can operate the facsimile machine simply by removing a selected form from bin 32, using a pencil or pen from bin 32, provide the required information on a document to be transmitted, and place the document on form feed platform 60 which directs it to the infeed region of the facsimile machine. The user then selects from the display panel's simplified indicia the location to which the document is to be transmitted, and presses the selected discrete region of the membrane so indicated. This activates a preselected speed-dialing routine which will dial the selected location, feed the document therein and transmit it accordingly. Once transmission has occurred the document is fed out through the lower section of the facsimile machine through slot 62 and fed back to the user through space 34.

The present device thus provides a housing for a facsimile machine to prevent substantial wear and tear thereon by unskilled users, simplified means for operating the machine to transmit documents to selected locations, and bins for supplies needed for such users.

While the present invention has been described in accordance with a preferred embodiment, it is to be understood that substitutions and alterations may be made thereto without departing from the spirit and scope of the appended claims.

I claim:

1. A device for assisting users to operate a facsimile machine which has an enclosing case, a document infeed, a document outfeed, and a series of control elements which are normally accessible and to be manually pressed by a user to operate the machine, said device comprising a housing for receiving such a facsimile machine therein, and keying elements mounted on said housing in positions to overlie control elements on a facsimile machine received in the housing, said keying elements having simplified indicia of machine function thereon and being shiftable between nonactuating positions spaced from the control elements of the facsimile machine and actuating positions contacting selected control elements to produce desired function of the facsimile machine.

2. The device of claim 1, wherein said housing has an aperture defined therein in a region above the control elements, a flexible membrane extends across said aperture and is secured adjacent its edge margins in said aperture, and said keying elements comprise regions of said membrane which may be flexed toward and away from the control elements.

3. The device of claim 2, wherein said flexible membrane normally is in an at-rest nonactuating position, is shiftable under operator actuation to its actuating position, and upon release returns to its nonactuating position.

4. The device of claim 2, wherein said flexible membrane includes multiple regions with simplified indicia thereon positioned to overlie selected control elements, said membrane having sufficient flexibility in the region of each indicia independent of remainder regions of the membrane to allow shifting a single indicia region of the membrane to its actuating position without shifting of an adjacent indicia region to its actuating position.

5. The device of claim 1, wherein the control elements on the facsimile machine are operable to actuate speed-dialing routines in the facsimile machine and the simplified indicia denote specific locations to which a communication is to be transmitted.

6. The device of claim 1, wherein said housing further comprises document infeed assist means operable to guide a document into proper location for receipt by the document infeed of the facsimile machine in the housing.

7. The device of claim 1, wherein said housing further comprises document outfeed directing means operable to direct a document from the facsimile machine outfeed to a selected region for receipt by the user.

8. The device of claim 1, wherein said housing further comprises storage bays operable to receive and hold materials to be used in operating the facsimile machine.

9. A device for assisting a user to communicate with others via a facsimile machine which has an enclosing case, a document infeed, a document outfeed, and a series of control elements which are normally accessible and to be pressed manually by a user to actuate speed-dialing routines in the machine to transmit documents to pre-selected locations, said device comprising
    a housing for receiving such a facsimile machine therein, and
    keying means on said housing positioned to overlie control elements on a facsimile machine received in the housing, said keying means having simplified indicia of machine function thereon positioned to overly selected ones of said control elements and being shiftable between a nonactuating position spaced from a control element of the facsimile machine and an actuating position contacting a control element to produce a desired transmission function of the facsimile machine.

10. The device of claim 9, wherein said keying means comprises a flexible membrane secured adjacent its edge margins in said housing with portions thereof overlying the control elements being free to flex toward and away from the control elements.

11. The device of claim 10, wherein said flexible membrane normally is in an at-rest nonactuating position, is shiftable under operator actuation to its actuating position, and upon release returns to its nonactuating position.

12. The device of claim 10, wherein said flexible membrane includes multiple regions with simplified indicia thereon positioned to overlie selected control elements on the facsimile machine, said membrane having sufficient flexibility in the region of each indicia independent of remainder portions of the membrane to allow shifting a single indicia region of the membrane to its actuating position without shifting of an adjacent indicia region to its actuating position.

13. The device of claim 9, wherein said housing further comprises document infeed assist means operable to guide a document into proper location for receipt by the document infeed of the facsimile machine in the housing.

14. The device of claim 9, wherein said housing further comprises document outfeed directing means operable to direct a document from the facsimile machine outfeed to a selected region for receipt by the user.

15. The device of claim 9, wherein said housing further comprises storage bays operable to receive and hold materials to be used in operating the facsimile machine.

16. The device of claim 9, wherein said keying means is detachably mounted on said housing to facilitate replacement with keying means bearing different operating indicia.

17. A device for assisting users to operate a facsimile machine which has a document infeed, a document outfeed, and a series of control elements which are to be pressed by a user to operate the machine, said device comprising
    a housing for receiving a facsimile machine therein, said housing comprising an access panel hingedly connected to remainder portions of said housing allowing said panel to be swung away from remainder portions of the housing to permit insertion or removal of the machine, and
    keying elements mounted on said housing in positions to overlie control elements on a machine received in the housing, said keying elements having simplified indicia of machine function thereon and being shiftable between nonactuating positions spaced from the control elements and actuating positions contacting selected control elements to produce desired function of the machine.

18. The device of claim 17, wherein a portion of said panel is positioned to overly control elements of a facsimile machine in the housing and an aperture is defined in said portion of the panel section.

19. The device of claim 18, wherein a flexible membrane is mounted in said aperture in the panel, said keying elements comprise regions of said membrane, and said housing further comprises a brace operable to support said panel a preselected distance from a facsimile machine in said housing with said flexible membrane in a preselected position relative to control elements on the machine.

20. A device for assisting a user to communicate with others via a facsimile machine which has a document infeed, a document outfeed, and a series of control elements which actuate speed-dialing routines in the machine to transmit documents to pre-selected locations, said device comprising
    a housing for receiving a facsimile machine therein, said housing comprising an access panel hingedly connected to remainder portions of said housing allowing said panel to be swung away from remainder portions of the housing to permit insertion or removal of the machine, and keying means on said housing positioned to overlie control elements on a machine received in the housing, said keying means having simplified indicia of machine function thereon positioned to overly selected ones of said control elements and being shiftable between a nonactuating position spaced from a control element and an actuating position contacting a control element to produce a desired transmission function of the machine.

21. The device of claim 20, wherein a portion of said panel is positioned to overlie control elements of a machine in the housing and an aperture is defined in said portion of the panel section.

22. The device of claim 21, wherein a flexible membrane is mounted in said aperture in the panel and said housing further comprises brace means operable to support said panel a preselected distance from a machine in said housing with said flexible membrane in a preselected position relative to control elements on the machine.

* * * * *